Oct. 8, 1929.     J. WISE     1,731,086
LAWN MOWER
Filed Oct. 24, 1927    2 Sheets-Sheet 1

John Wise
INVENTOR

BY Victor J. Evans
ATTORNEY

WITNESS: A.E. Wise.

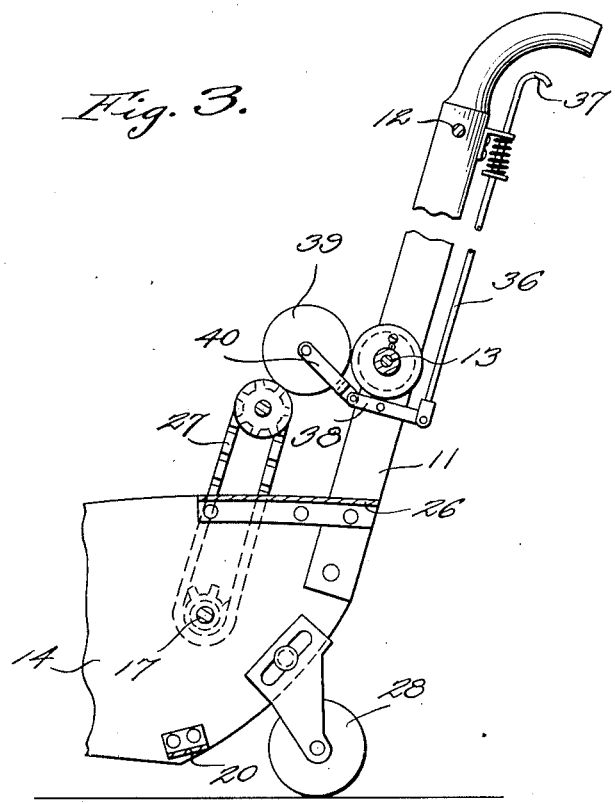
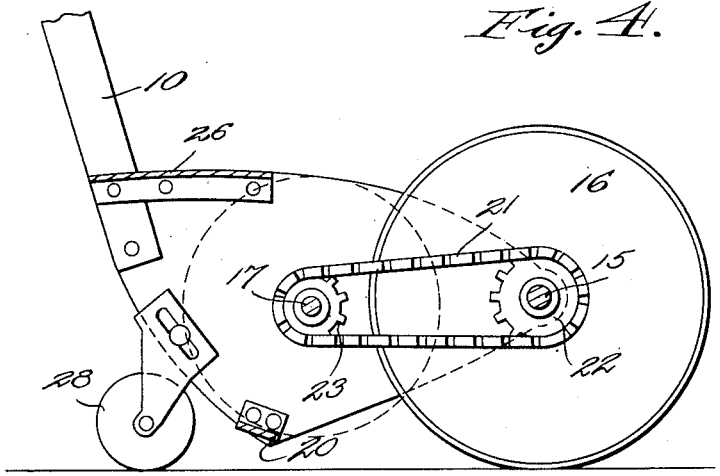

Patented Oct. 8, 1929

1,731,086

UNITED STATES PATENT OFFICE

JOHN WISE, OF SALINA, KANSAS

LAWN MOWER

Application filed October 24, 1927. Serial No. 228,383.

This invention relates to power driven lawn mowers.

An object of the invention comprehends a direct driving connection between the ground wheels for the mower and the cutter members therefor.

Another object of the invention contemplates a motor adapted for operative connection with the wheel and cutters.

A further object of the invention consists of a spool member adapted to wind a feed line for the motor thereon.

More specifically stated, a driving connection is adapted to be established between the motor and spool for reeling the feed line thereon.

With the above and other objects in view, the invention further consists of the following novel features and details of construction, to be hereinafter more fully described, illustrated in the accompanying drawings and pointed out in the appended claim.

In the drawings:

Figure 3 is a fragmentary side elevation of the invention.

Figure 4 is a transverse sectional view taken through the invention and illustrating the driving connection between the traction wheels and cutter members.

Figure 1:
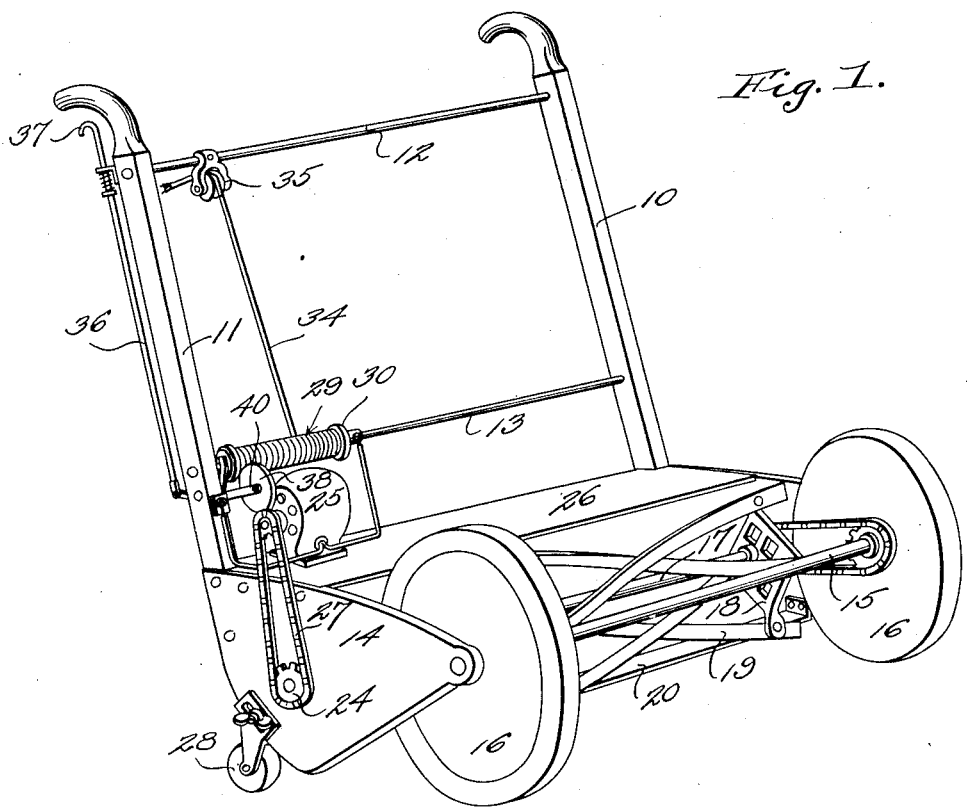
Figure 1 is a perspective of the invention.
Figure 2:
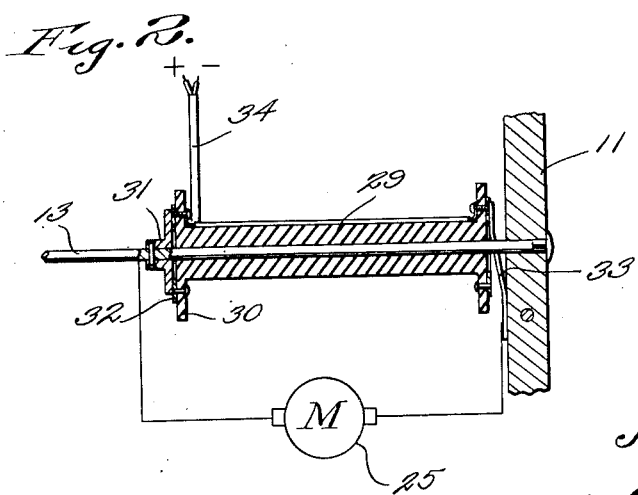
Figure 2 is a longitudinal sectional view taken through the reel structure.

Referring to the drawings in detail, wherein like characters of reference denote corresponding parts, the reference characters 10 and 11 indicate handle members having connection with brace bars 12 and 13 respectively. Plate members 14 carried upon the outer sides and adjacent the lower ends of the handle members 10 and 11 are adapted to journal the ends of a shaft member 15 within the outer ends thereof which have fixed or otherwise secured thereto, ground or traction wheels 16. A similar shaft member 17 journaled between the plates 14 is provided with spacing plates 18 adapted for connection with cutter blades or members 19 adapted for use in conjunction with the stationary blade member 20, also carried by the plate members.

A driving connection is established between the two shafts by means of a chain 21 passed over sprocket gears 22 and 23 carried by the shafts 15 and 17 respectively, said gears being fixed to the shafts.

An additional gear 24 is carried upon one end of the shaft 17 projecting through an adjacent plate member. A motor 25 mounted upon a supporting plate 26 is adapted for connection with the gear member 24 through the instrumentality of a chain member 27, substantially as illustrated in Figures 1 and 3 of the drawing.

An adjustably mounted roller member 28 carried by the plate members 14 is established to regulate the height of the stationary plate 20 and the depth of the cut.

A spool or reel member 29 rotatably mounted upon the brace bar 13 is provided with flange portions 30 upon the ends thereof. A stop collar 31 carried by the shaft 13 is adapted for contacting engagement with a contact ring 32 carried upon the adjacent side of one of the flanges 30 to establish connection between the stop collar and the motor 25. A spring finger 33 carried upon the inner side of the handle member 11 is adapted to frictionally engage the adjacent end of the spool or reel member 29 to preserve contacting engagement between the stop collar and contact ring. The spring finger is also adapted to establish an electrical connection with the motor from a different pole. The terminals of a cable member 34 have connection with the contact portions of the roller members. The cable being passed over a pulley member carried by the brace bar 12.

In the use of the invention, the feed line or cable is paid from the reel.

In order to facilitate the rewinding of the reel of the cable or feed line upon the roller member, I provide an operating lever 36 mounted upon the handle member 11 and provided with a hook portion 37 upon one end to facilitate reciprocating action thereof. A link 38 pivotally mounted at an appropriate point in its length for lateral swinging movement upon the handle member 11 is adapted for connection at one end with the operating lever 36. A friction disk 39 carried by a yoke member 40 having connection with the link 38 is adapted to establish a driving connection between the motor and roller member when the mower is tilted to rest solely upon the roller member 28 to free the traction or driving wheels 15 from the lawn.

The invention is susceptible of various changes in its form, proportions and minor details of construction, and the right is herein reserved to make such changes as properly fall within the scope of the appended claim.

Having thus described the invention, what is claimed is:—

A reel attachment for lawn mowers journaled upon the frame therefor, flanges carried upon the ends of the reel, a stop collar mounted upon the frame and having connection with one of the flanges, contact rings included upon each of the flanges, and a spring finger frictionally engaged with the contact ring upon the free flange.

In testimony whereof I affix my signature.

JOHN WISE.